United States Patent

Kawabata

Patent Number: 5,987,072
Date of Patent: Nov. 16, 1999

[54] PHASE MODULATION SCHEME AND APPARATUS

[75] Inventor: Hisashi Kawabata, Tokyo, Japan

[73] Assignee: NEC Corporation, Tokyo, Japan

[21] Appl. No.: 08/838,036

[22] Filed: Apr. 22, 1997

[30] Foreign Application Priority Data

Apr. 26, 1996 [JP] Japan ................................ 8-106540

[51] Int. Cl.$^6$ .............................. H04L 27/20; H03C 3/00
[52] U.S. Cl. ..................... 375/308; 332/103; 332/144; 455/42; 327/254
[58] Field of Search .................................. 375/308, 279, 375/298, 261, 295; 332/103, 104, 144; 455/110, 42; 327/231, 238, 237, 254

[56] References Cited

U.S. PATENT DOCUMENTS

| | | | |
|---|---|---|---|
| 5,091,919 | 2/1992 | Kuisma | 375/298 |
| 5,491,457 | 2/1996 | Feher | 332/103 |
| 5,521,559 | 5/1996 | Ichihara | 375/308 |
| 5,548,253 | 8/1996 | Durrant | 332/103 |

FOREIGN PATENT DOCUMENTS 0 397 077  11/1990  European Pat. Off. .

62-269446  11/1987  Japan .
1-276860  11/1989  Japan .

*Primary Examiner*—Stephen Chin
*Assistant Examiner*—Betsy L. Deppe
*Attorney, Agent, or Firm*—Young & Thompson

[57] ABSTRACT

In phase modulation of the quadrature signals of a multi-valued digital signal, when the signal state transition is π [rad], the spectrum of a nonlinear amplifier extends beyond the transmission bandwidth, and the conversion distortion becomes conspicuous. A phase modulation apparatus includes a phase shifter (11) which receives a multi-valued digital signal, converts the digital signal into two quadrature signals such that a period for which the self phase shift amount of the digital signal on an orthogonal coordinate system becomes π/2 [rad] at the time of state transition of the digital signal is always obtained, and outputs the quadrature signals, a bandwidth limiting filter (12) which band-limits the outputs from the phase shifter (11), and a phase modulator (13) for phase-modulating the output from the bandwidth limiting filter (12). Since the state transition is π/2 [rad], extension of the spectrum beyond the transmission bandwidth is suppressed in a nonlinear amplifier, and the conversion distortion is relaxed.

7 Claims, 11 Drawing Sheets

FREQUENCY →

FIG. 4
PRIOR ART

FREQUENCY →

FREQUENCY →

FIG. 15

FREQUENCY →

5,987,072

PHASE MODULATION SCHEME AND APPARATUS

BACKGROUND OF THE INVENTION

1. Field of the Invention

The present invention relates to a digital communication system using phase modulation and, more particularly, to a phase modulation scheme and apparatus.

2. Description of the Prior Art

Figure 1:
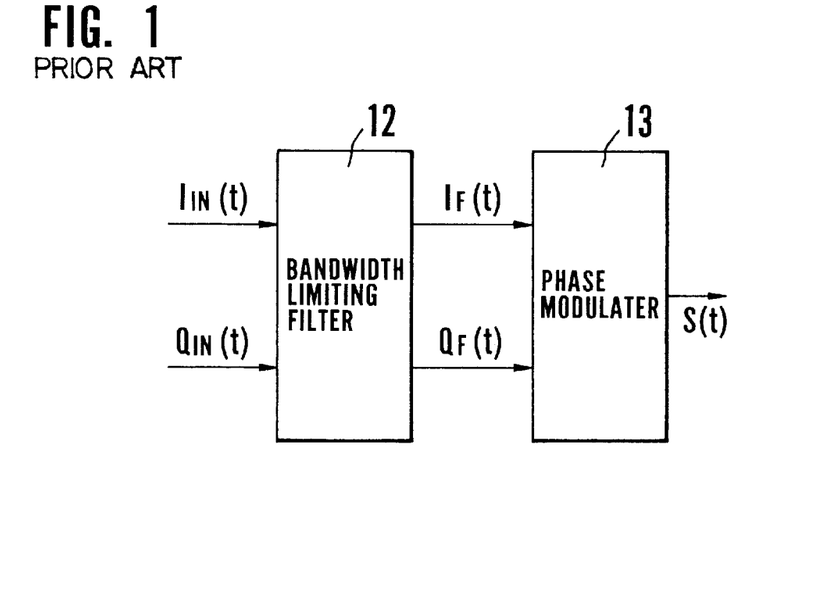
FIG. 1 is a block diagram showing the overall arrangement of a conventional phase modulation apparatus.
Figure 2:
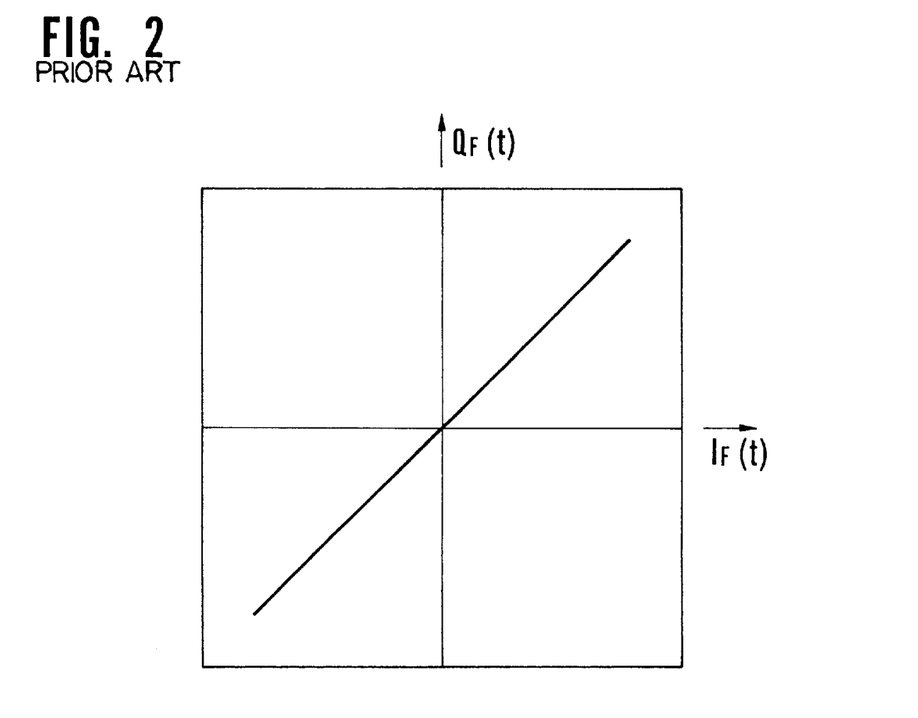
FIG. 2 is a diagram showing the output from a conventional bandwidth limiting filter.
Figure 3:
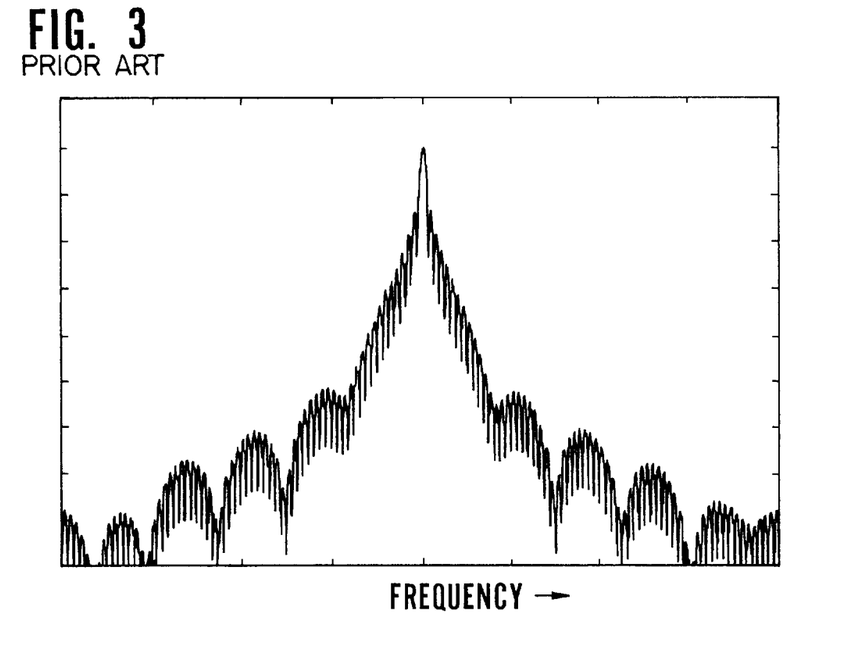
FIG. 3 is spectral diagram of the output from a nonlinear amplifier in the arrangement shown in FIG. 1.
Figure 4:
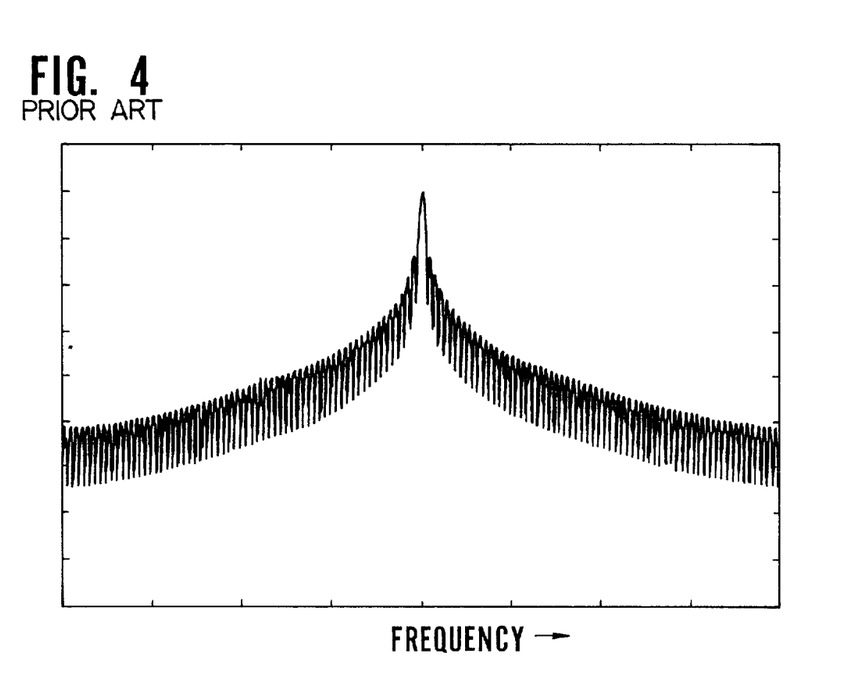
FIG. 4 is spectral diagram of the output from a class C amplifier in the arrangement shown in FIG. 1.

FIG. 1 shows a conventional phase modulation apparatus. Referring to FIG. 1, the phase modulation apparatus is constituted by a bandwidth limiting filter 12 which receives two transmission baseband signals $I_{IN}(t)$ and $Q_{IN}(t)$ and performs band limitation by removing high-frequency components, and a phase modulator 13 which receives outputs $I_F(t)$ and $Q_F(t)$ from the bandwidth limiting filter 12 and outputs a phase-modulated signal S(t). In this phase modulation apparatus, the outputs $I_F(t)$ and $Q_F(t)$ from the bandwidth limiting filter 12 are always phase-shifted by $\pi$ [rad], as shown in FIG. 2. FIGS. 3 and 4 show the transmission simulation results of BPSK modulation in which the two outputs are phase-modulated by the phase modulator 13. In the BPSK modulation, the two transmission baseband signals $I_{IN}(t)$ and $Q_{IN}(t)$ are identical. FIG. 3 shows a case wherein the BPSK-modulated wave which has undergone band limitation is amplified by a nonlinear amplifier. FIG. 4 shows a case wherein the BPSK-modulated wave is amplified using the saturation region of a class C amplifier.

As described above, in the conventional BPSK modulation apparatus, the output from the modulator is always phase-shifted by $\pi$ [rad] in accordance with a change in signal state transition of the transmission baseband signal. Although not described above, a QPSK modulator also has a state transition mode with a phase shift of $\pi$ [rad]. When the phase-modulated wave which has undergone band limitation is amplified by the nonlinear amplifier, the spectrum extends beyond the estimated transmission bandwidth to cause spectral spillover, and spurious noise or envelope variations increase due to the conversion distortion of the amplifier, as shown in FIG. 3. This also applies to amplification using the class C amplifier, as shown in FIG. 4. For this reason, interference from adjacent channels poses a problem. Additionally, the conversion distortion increases phase errors in the transmission signal. These problems increase the digital error rate on the receiver side.

To avoid such problems, the conventional BPSK modulation uses ABPSK ($\pi/2$-shift BPSK). In QPSK modulation, $\pi/4$-shift QPSK or OQPSK is used. However, since ABPSK, $\pi/4$-shift QPSK, and OQPSK require corresponding demodulation techniques, the characteristics of the modulated wave are not improved in a communication system using BPSK or QPSK modulation.

SUMMARY OF THE INVENTION

It is an object of the present invention to provide a phase modulation scheme and apparatus which can suppress extension of the spectrum beyond the transmission bandwidth produced by phase modulation in multi-valued digital signal modulation such as BPSK or QPSK.

According to the present invention, there is provided a phase modulation scheme in a digital communication scheme of phase-modulating a multi-valued digital signal and outputting the digital signal, wherein the digital signal is subjected first to phase conversion to always obtain a period for which a phase shift amount of the digital signal on an orthogonal coordinate system becomes $\pi/2$ [rad], and then to phase modulation. In this case, one stream of a binary digital signal is delayed by a predetermined timing with respect to the other at the time of state transition of the binary digital signal, thereby setting the phase shift amount to be $\pi/2$ [rad]. Preferably, the state transition of the binary digital signal is detected, and one stream of the binary digital signal is selected and delayed on the basis of the detection result.

According to the present invention, there is also provided a phase modulation apparatus comprising a phase shifter which receives a multi-valued digital signal, converts the digital signal into two quadrature signals such that a period for which a self phase shift amount of the digital signal on an orthogonal coordinate system becomes $\pi/2$ [rad] at the time of state transition of the digital signal is always obtained, and outputs the quadrature signals, wherein the outputs from the phase shifter are phase-modulated. A preferred embodiment of the present invention further comprises a bandwidth limiting filter which receives the outputs from the phase shifter to remove high-frequency components in a baseband, and a phase modulator which receives an output from the bandwidth limiting filter to perform phase modulation. In the present invention, the phase shifter comprises a delay device for delaying one of the two quadrature signals by a predetermined timing with respect to the other. The phase shifter further comprises a detector for detecting the state transition of the digital signal, and a switch for selectively connecting the delay device to one or the other of the quadrature signals. Preferably, the switch is selectively operated on the basis of a detection result from the detector.

DETAILED DESCRIPTION OF THE PREFERRED EMBODIMENTS

The embodiments of the present invention will now be described below with reference to the accompanying drawings.

Figure 5:
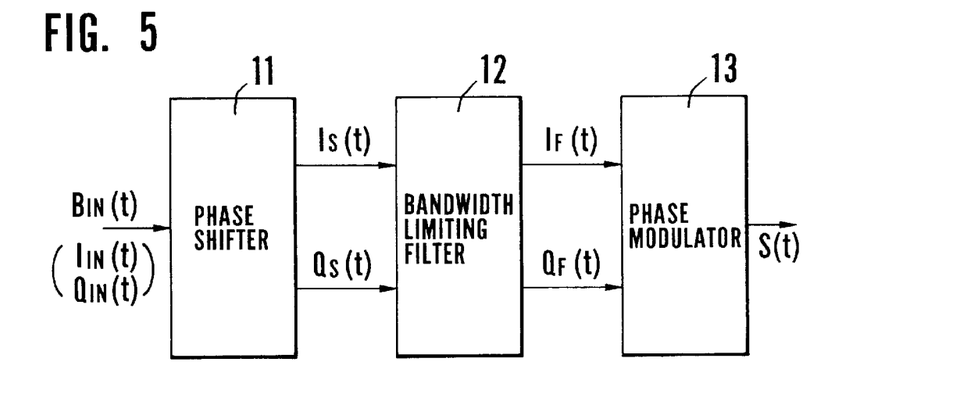
FIG. 5 is a block diagram showing the overall arrangement of a phase modulation apparatus according to an embodiment of the present invention.

FIG. 5 is a block diagram showing the first embodiment of the present invention. A phase modulation apparatus according to this embodiment is constituted by a phase shifter 11 which receives a binary transmission baseband signal $B_{IN}(t)$ [$I_{IN}(t)$ and $Q_{IN}(t)$] from the input terminal and outputs two signals Is(t) and Qs(t) which always have a phase shift amount of $\pi/2$ [rad] when the signal state changes, a bandwidth limiting filter 12 which removes high-frequency components contained in these transmission baseband signals for band limitation, and a phase modulator 13 which receives output data from the bandwidth limiting filter 12 and outputs a phase-modulated signal.

Figure 6A:
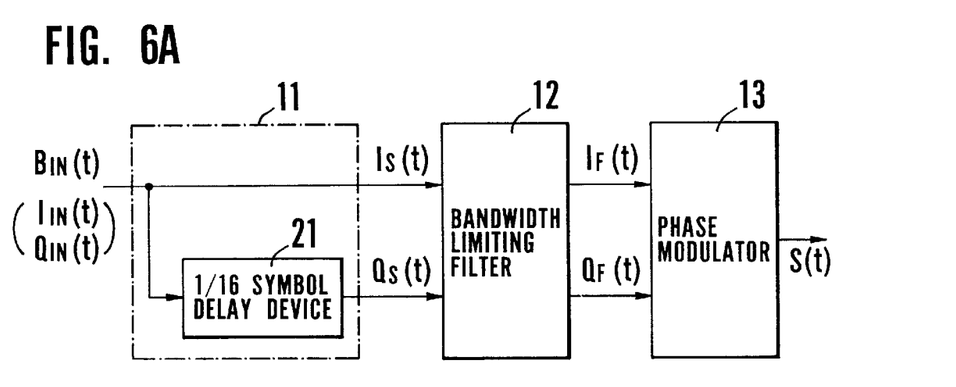
FIG. 6A is a block diagram showing the internal arrangement of a phase shifter in the first embodiment.
Figure 6B:
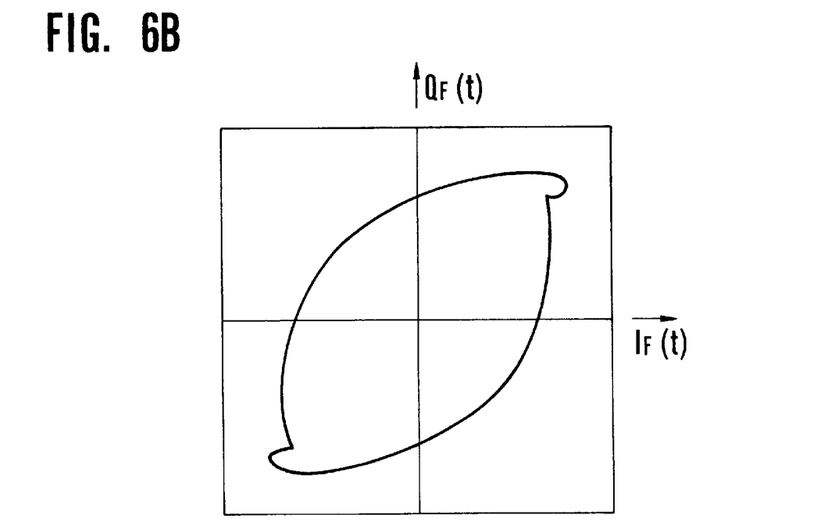
FIG. 6B is a diagram showing the output from a bandwidth limiting filter in the first embodiment.

FIG. 6A is a block diagram showing the internal arrangement of the phase shifter 11. The phase shifter 11 is constituted by a 1/16-symbol delay device 21. The binary transmission baseband signal $B_{IN}(t)$ is input to the phase shifter 11 and branched into two signals. One signal is directly output as Is(t), and the other signal is delayed by 1/16 by the 1/16-symbol delay device 21 and output as Qs(t). The signals Is(t) and Qs(t) are output as a modulated wave S(t) via the bandwidth limiting filter 12 and the phase modulator 13. As a result, outputs $I_F(t)$ and $Q_F(t)$ from the bandwidth limiting filter 12 exhibit characteristics shown in FIG. 6B.

Figure 7A:
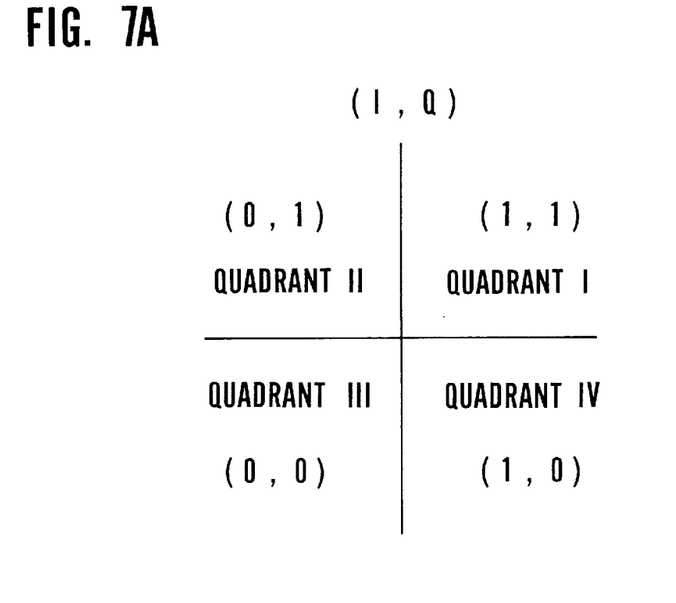
FIG. 7A is a diagram showing the respective quadrants in the phase shifter shown in FIG. 6A.
Figure 7B:
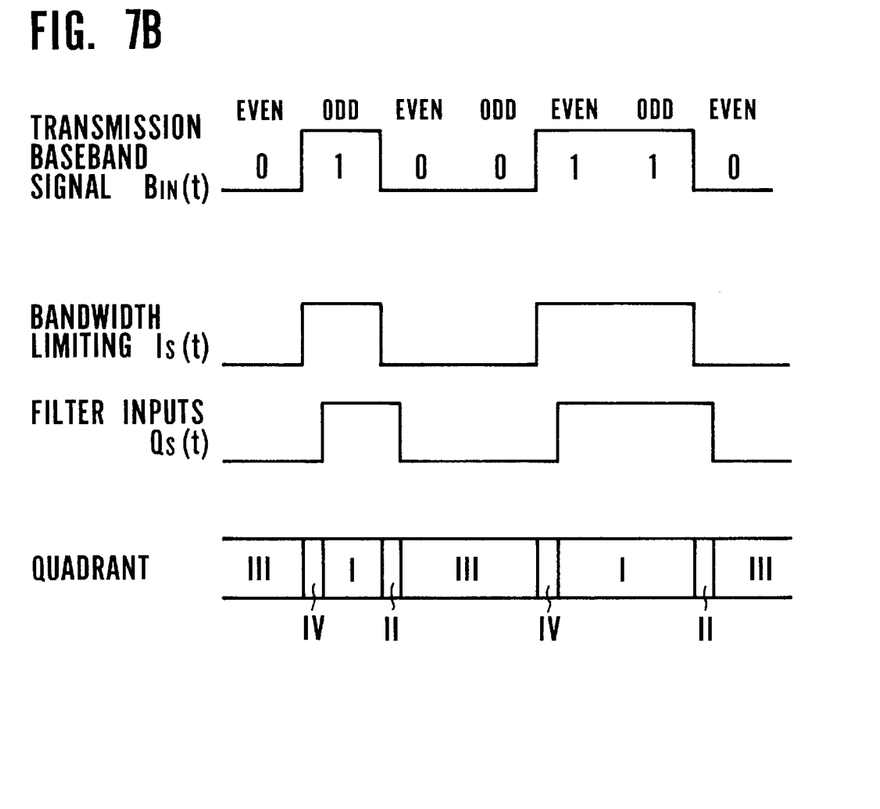
FIG. 7B is a timing chart of signals.

FIG. 7B is a timing chart showing the relationship among the signal $B_{IN}(t)$ input to the phase shifter 11 and the signals Is(t) and Qs(t) output from the phase shifter 11 and the quadrants on the phase plane. FIG. 7A shows the respective quadrants. For the signals Is(t) and Qs(t) output from the phase shifter 11, the signal Qs(t) is always delayed by 1/16 with respect to the signal Is(t) at the time of change in signal state. For this reason, the signal phase falls in the quadrant II or IV during the period corresponding to the 1/16 symbol. The phase shift amount is $\pi/2$ [rad].

Figure 8:
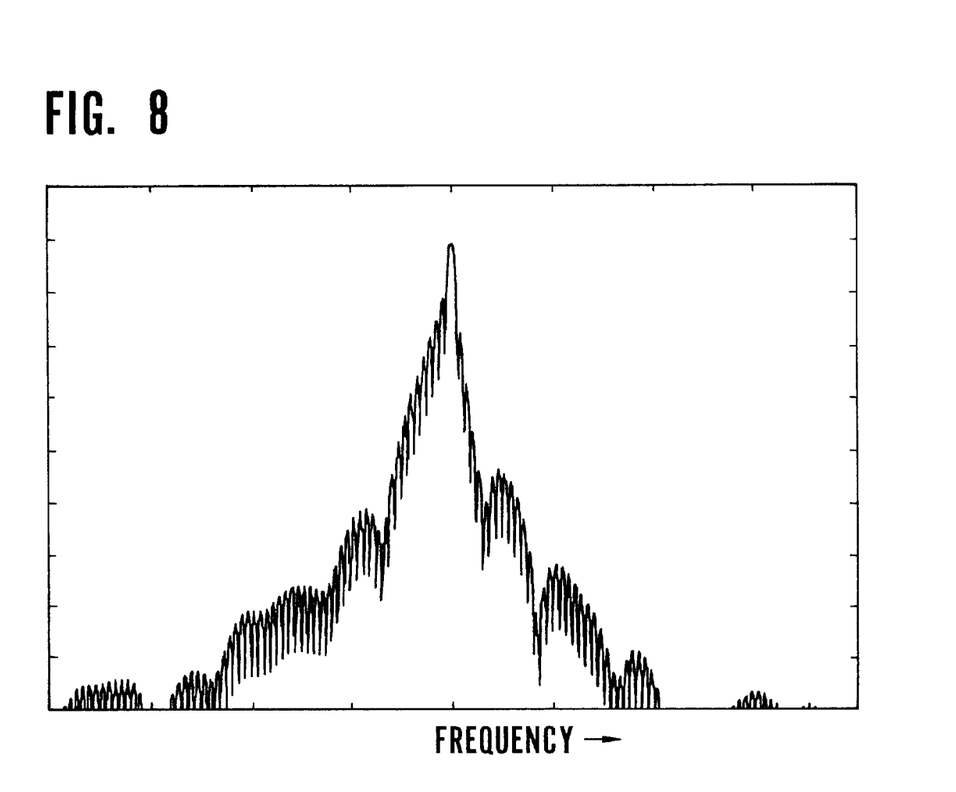
FIG. 8 is spectral diagram of the output from a nonlinear amplifier in the phase shifter shown in FIG. 6A.

When the phase shift amount at the time of change in signal state is set to be $\pi/2$ [rad], and the transmission output S(t) from the phase modulator 13 is applied to a nonlinear amplifier, a transmission output simulation result shown in FIG. 8 is obtained. As is apparent from FIG. 8, spurious noise is suppressed, as compared to the conventional transmission output simulation result shown in FIG. 3.

Figure 9:
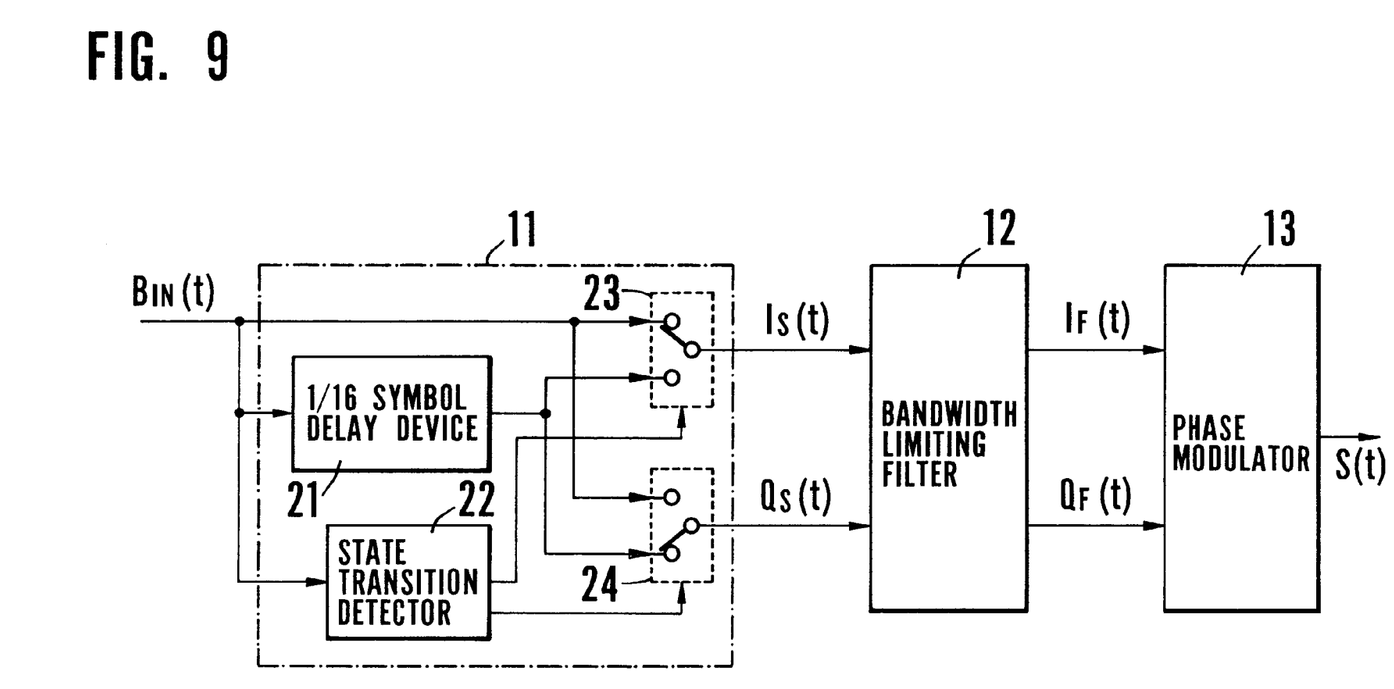
FIG. 9 is a block diagram showing the internal arrangement of a phase shifter according to the second embodiment of the present invention.

FIG. 9 is a block diagram showing the internal arrangement of a phase shifter used in the second embodiment of the present invention.

A phase shifter 11 comprises a 1/16-symbol delay device 21, a state transition detector 22 for detecting the state transition of an input $B_{IN}(t)$, and switches 23 and 24 for switching the 1/16-symbol delay device 21 to the Is(t) or Qs(t) side on the basis of the output from the state transition detector 22. The input binary transmission baseband signal $B_{IN}(t)$ is branched into two signals. One signal is delayed by a 1/16 symbol by the 1/16-symbol delay device 21 into $B_{IN}(t-Ts/16)$. Ts is the symbol period. The state transition detector 22 detects the state transition of the signal $B_{IN}(t)$ and outputs control signals for the switches 23 and 24 in accordance with a flow to be described later. The switch 23 switches the output Is(t) to $B_{IN}(t)$ or $B_{IN}(t-Ts/16)$ in accordance with the output from the state transition detector 22. The switch 24 switches the output Qs(t) to $B_{IN}(t)$ or $B_{IN}(t-Ts/16)$ in accordance with the output from the state transition detector 22. The signals Is(t) and Qs(t) are output as a modulated wave S(t) via a bandwidth limiting filter 12 and a phase modulator 13.

Figure 10A:
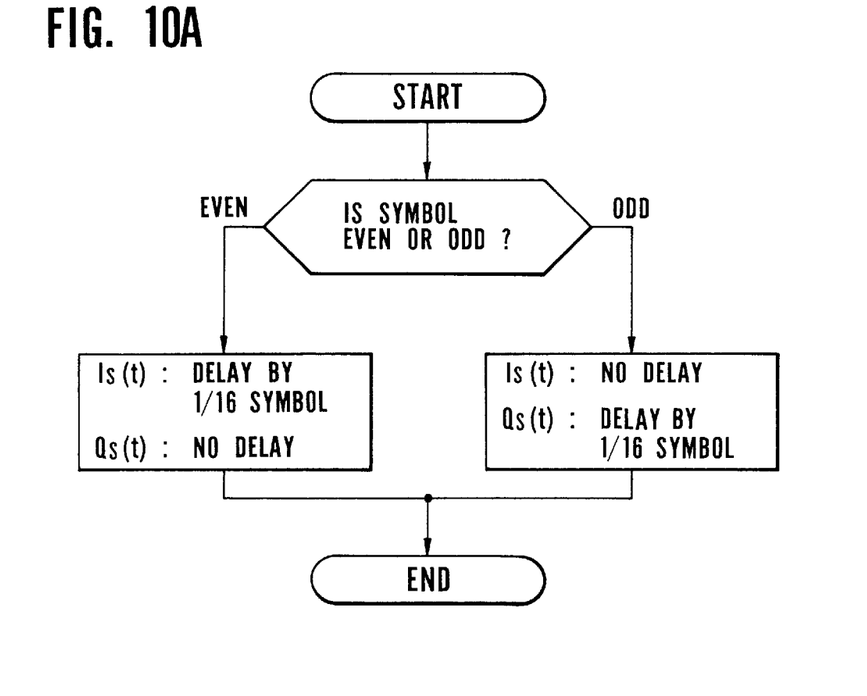
FIGS. 10A and 10B are flow charts showing different operations of the phase shifter shown in FIG. 9.
Figure 11A:
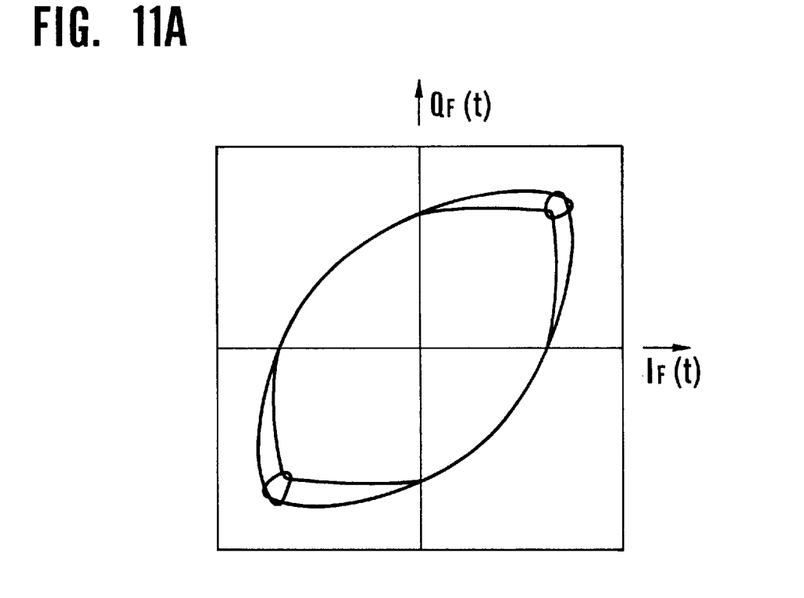
FIG. 11A is a diagram showing the output from the bandwidth limiting filter in the arrangement shown in FIG. 9 based on the flow in FIG. 10A.
Figure 11B:
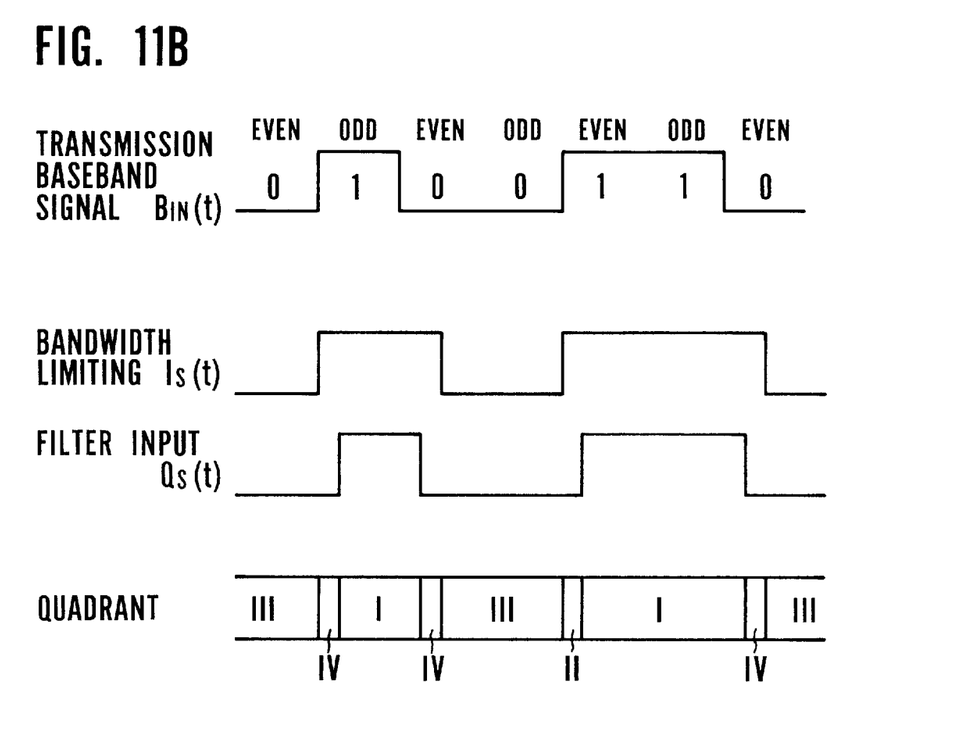
FIG. 11B is a timing chart of signals.

FIG. 10A is a flow chart showing an example of the selection flow of the switches 23 and 24 in the state transition detector 22. In this example, for even symbols, the 1/16-symbol delay device 21 is connected to the Is(t) side to delay the signal Is(t). For odd symbols, the signal Qs(t) is delayed. Consequently, outputs $I_F(t)$ and $Q_F(t)$ from the bandwidth limiting filter 12 exhibit characteristics shown in FIG. 11A. FIG. 11B shows the relationship among the signals $B_{IN}(t)$, Is(t), and Qs(t) at that time and the quadrants on the phase plane of the signals. As is apparent from FIG. 11B, for the signals Is(t) and Qs(t) output from the phase shifter 11, one of the signals Qs(t) and Is(t) is delayed by a 1/16 symbol with respect to the other in accordance with the signal state transition. For this reason, the signal phase falls in the quadrant II or IV for a period corresponding to the 1/16 symbol. The phase shift amount is $\pi/2$ [rad].

Figure 12:
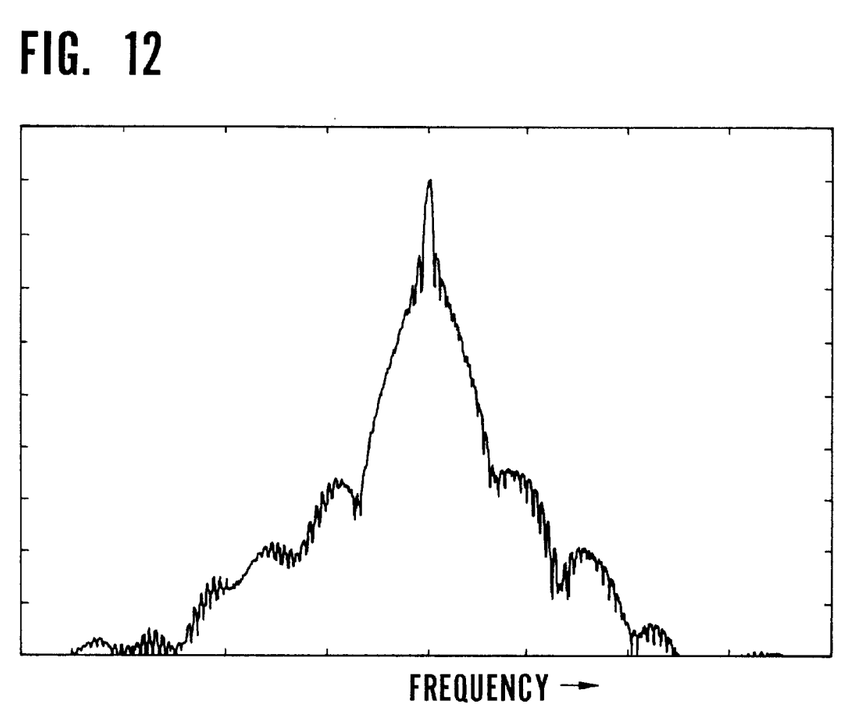
FIG. 12 is spectral diagram of the output from the nonlinear amplifier based on the operation shown in FIGS. 11A and 11B.

When the phase shift amount at the time of change in signal state is set to be $\pi/2$ [rad], and the transmission output S(t) from the phase modulator 13 is applied to the nonlinear amplifier, a transmission output simulation result shown in FIG. 12 is obtained. As is apparent from FIG. 12, spurious noise is suppressed, as compared to the conventional transmission output simulation result shown in FIG. 3.

Figure 10B:
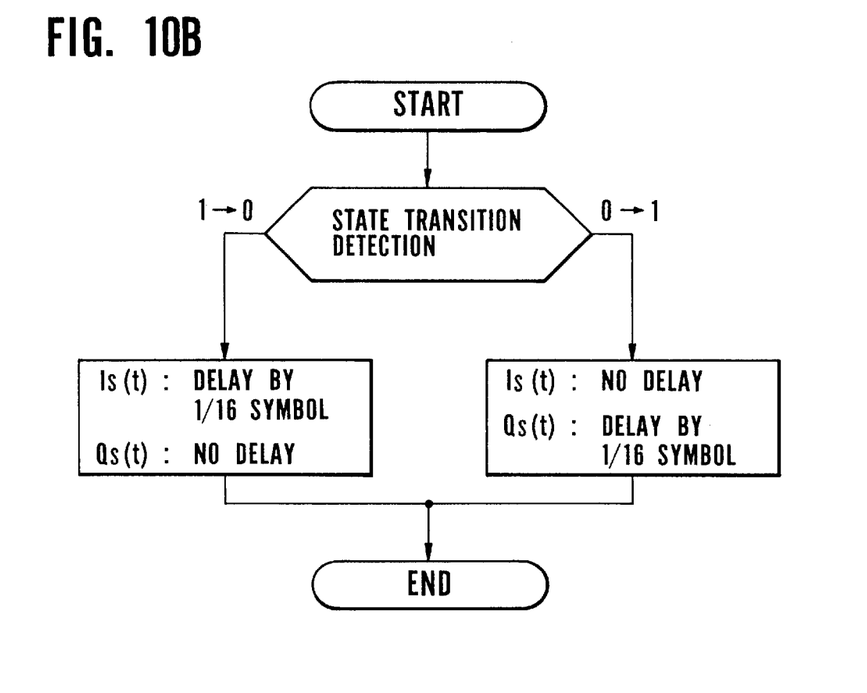
Figure 13A:
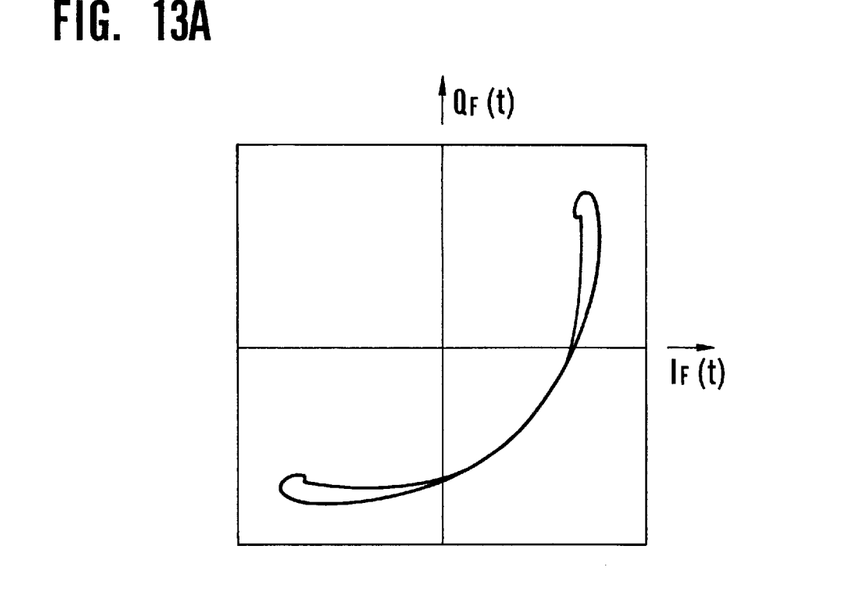
FIG. 13A is a diagram showing the output from the bandwidth limiting filter in the arrangement shown in FIG. 9 based on the flow in FIG. 10B.
Figure 13B:
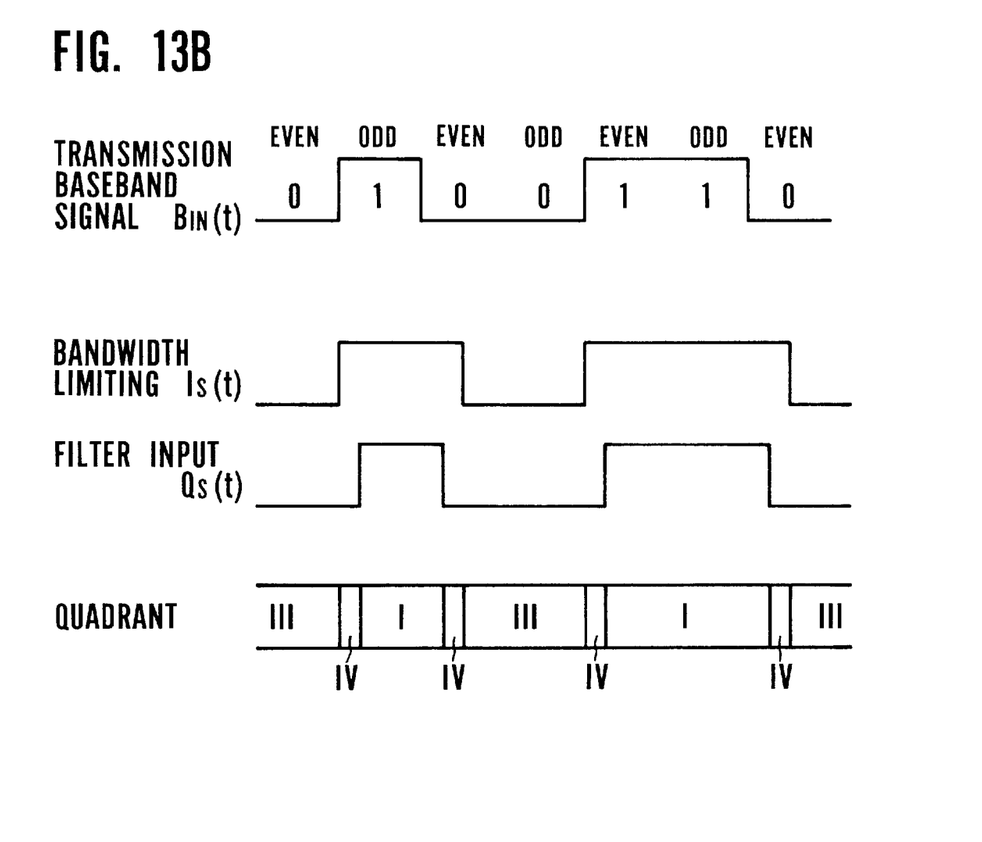
FIG. 13B is a timing chart of signals.

On the other hand, assume that the flow shown in FIG. 10B is employed as the selection flow of the switches 23 and 24 in the state transition detector 22. When the signal $B_{IN}(t)$ transits from 1 to 0, the 1/16-symbol delay device 21 is connected to the Is(t) side to delay the signal Is(t). When the signal $B_{IN}(t)$ transits from 0 to 1, the signal Qs(t) is delayed. Consequently, the outputs $I_F(t)$ and $Q_F(t)$ from the bandwidth limiting filter 12 exhibit characteristics shown in FIG. 13A. FIG. 13B shows the relationship among the signals $B_{IN}(t)$, Is(t), and Qs(t) at that time and the quadrants on the phase plane of the signals. As is apparent from FIG. 13B, for the signals Is(t) and Qs(t) output from the phase shifter 11, one of the signals Qs(t) and Is(t) is delayed by a 1/16 symbol with respect to the other in accordance with the signal state transition. For this reason, the signal phase falls in the quadrant II or IV for a period corresponding to the 1/16 symbol. The phase shift amount is $\pi/2$ [rad].

Figure 14:
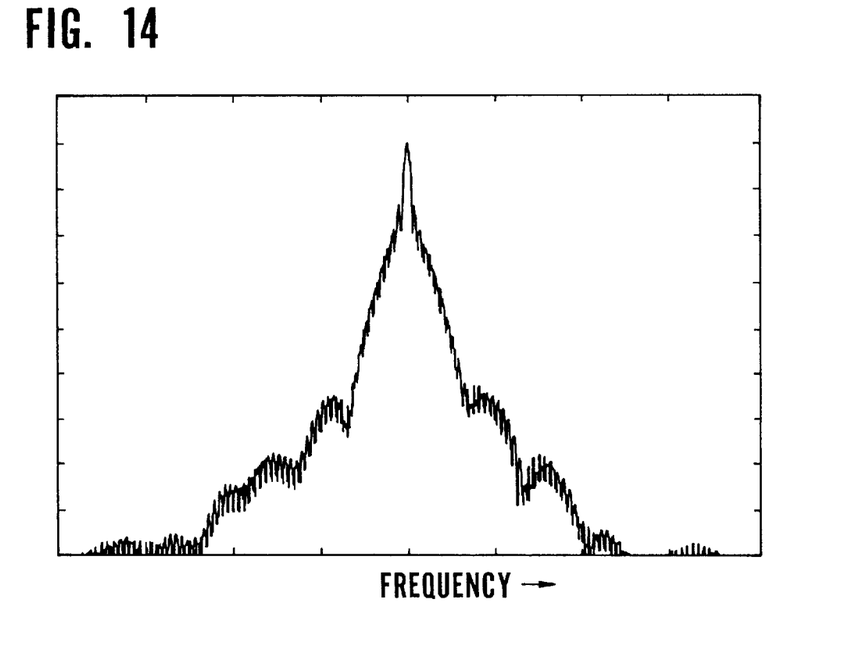
FIG. 14 is spectral diagram of the output from the nonlinear amplifier based on the operation shown in FIGS. 13A and 13B.
Figure 15:
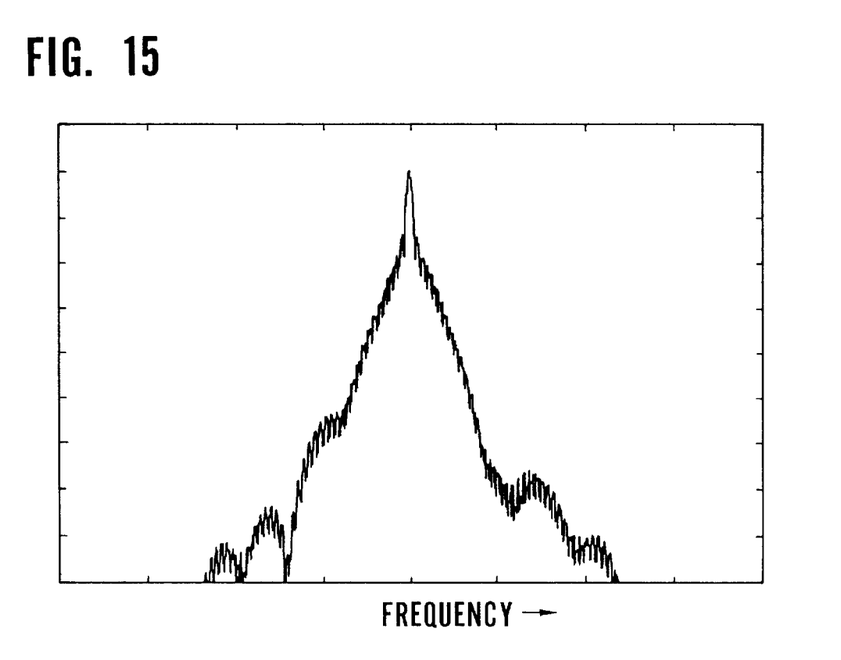
FIG. 15 is spectral diagram of the output from a class C amplifier based on the operation shown in FIGS. 13A and 13B.

When the phase shift amount at the time of change in signal state is set to be $\pi/2$ [rad], and the transmission output S(t) from the phase modulator 13 is applied to the nonlinear amplifier, a transmission output simulation result shown in FIG. 14 is obtained. As is apparent from FIG. 14, spurious noise is suppressed, as compared to the conventional transmission output simulation result shown in FIG. 3. FIG. 15 shows a transmission output simulation result obtained in amplification using the saturation region of a class C amplifier. In this case as well, spurious noise is largely suppressed, as compared to the conventional class C amplifier transmission output simulation result shown in FIG. 4.

In each of the above embodiments, the present invention is applied to BPSK modulation. However, the present invention can be applied to QPSK modulation, as a matter of course.

As has been described above, according to the present invention, when a multi-valued digital signal is to be phase-modulated, the digital signal is subjected first to phase conversion to always obtain a period for which the phase shift amount of the digital signal on an orthogonal coordinate system becomes $\pi/2$ [rad], and then to phase modulation. With this arrangement, phase modulation is not performed while the signal phase shift amount is $\pi$ [rad]. In addition, extension of the spectrum beyond the transmission bandwidth due to the AM/AM conversion distortion can be suppressed in the nonlinear amplifier or class C amplifier, so that interference from adjacent channels can be prevented. In addition, since the maximum phase shift amount is $\pi/2$ [rad], amplitude variations of the bandwidth limiting filter output can be reduced, and the influence of the AM/PM conversion distortion in the nonlinear amplifier can be decreased to improve the digital error rate. Furthermore, since no special scheme is required for demodulation, this arrangement can be applied to a communication system using BPSK or QPSK modulation without any modification.

What is claimed is:

1. A method of phase modulating a digital signal in a digital communication system, the method comprising the steps of:

receiving a binary digital signal having two components, namely in-phase and quadrature components;

detecting state transitions of the binary digital signal;

selecting one of the two components to be delayed based on the detected state transitions;

delaying the selected one of the two components with respect to the other at a time of a state transition based on the detected state transitions so that a phase shift between the two components is always $\pi/2$ (rad); and phase modulating the two components.

2. The method of claim 1, wherein the delay is 1/16 of a bit length.

3. The method of claim 1, further comprising the step of bandwidth limiting the two components after the delaying step and before the phase modulating step.

4. A phase modulation apparatus for phase modulating a digital signal in a digital communication system, the apparatus comprising:

means for receiving a binary digital signal having two components, namely in-phase and quadrature components;

means for detecting state transitions of the binary digital signal;

means for selecting one of the two components to be delayed based on the detected state transitions;

means for delaying the selected one of the two components with respect to the other at a time of a state transition based on the detected state transitions so that a phase shift between the two components is always $\pi/2$ (rad); and means for phase modulating the two components.

5. The apparatus of claim 4, wherein said means for delaying comprises means for delaying the selected one of the two components by 1/16 of a bit length.

6. The apparatus of claim 4, further comprising filter means for bandwidth limiting the two components after one has been delayed by said delaying means and before the two components have been phase modulated by said phase modulating means.

7. A phase modulation apparatus, comprising:

a phase shifter having a detector detecting state transitions of an input digital signal;

a delay device delaying one of an in-phase and quadrature component of the input digital signal; and a switch selectively connecting one of the in-phase and quadrature components to said delay device, said switch being operably connected to said detector and operating in response to a result from said detector.

* * * * *